(12) United States Patent
Kwong et al.

(10) Patent No.: US 10,341,751 B2
(45) Date of Patent: Jul. 2, 2019

(54) ELECTRONIC DEVICE HAVING EXPANDABLE SPEAKER BOX

(71) Applicant: INTEL CORPORATION, Santa Clara, CA (US)

(72) Inventors: Wah Yiu Kwong, Beaverton, OR (US); Hong W. Wong, Portland, OR (US); Yanbing Sun, Shanghai (CN); Xiaoguo Liang, Shanghai (CN); Rita Wouhaybi, Portland, OR (US); Kannan Raja, Hillsboro, OR (US); Prosenjit Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 14/127,201

(22) PCT Filed: Dec. 27, 2012

(86) PCT No.: PCT/CN2012/087629
§ 371 (c)(1),
(2) Date: Dec. 18, 2013

(87) PCT Pub. No.: WO2014/101033
PCT Pub. Date: Jul. 3, 2014

(65) Prior Publication Data
US 2014/0341418 A1    Nov. 20, 2014

(51) Int. Cl.
*G06F 1/16* (2006.01)
*H04R 1/02* (2006.01)
(Continued)

(52) U.S. Cl.
CPC .......... *H04R 1/025* (2013.01); *G06F 1/1605* (2013.01); *H04R 1/02* (2013.01); *H04R 1/2811* (2013.01);
(Continued)

(58) Field of Classification Search
CPC ........ H04R 1/025; H04R 1/02; H04R 1/2811; H04R 3/04; H04R 17/00; H04R 19/02;
(Continued)

(56) References Cited

U.S. PATENT DOCUMENTS 6,078,497 A * 6/2000 Derocher .............. G06F 1/1616
345/905
6,243,260 B1 * 6/2001 Lundgren ............. G06F 1/1616
361/679.23

(Continued)

FOREIGN PATENT DOCUMENTS

CN     101082826     12/2007
CN     101340468     1/2009
(Continued)

OTHER PUBLICATIONS

International Search Report and Written Opinion for PCT/CN2012/087629 dated Sep. 26, 2013.

*Primary Examiner* — Sean H Nguyen
(74) *Attorney, Agent, or Firm* — Schwabe, Williamson & Wyatt, P.C.

(57) ABSTRACT

An electronic device having at least one expandable speaker box is provided. The electronic device may include a base having at least one speaker disposed therein and at least one speaker box configured to expand. The electronic device may include further include a lid having a display configured to be attached to the base. The at least one speaker box may be at least partially formed of a compressible-expandable material, such as rubber. Alternatively, the at least one speaker box may be at least partially formed of a bi-metal material that expands when exposed to heat.

21 Claims, 7 Drawing Sheets

(51) Int. Cl.
  *H04R 1/28* (2006.01)
  *H04R 3/04* (2006.01)
  *H04R 17/00* (2006.01)
  *H04R 19/02* (2006.01)

(52) U.S. Cl.
  CPC ............... *H04R 3/04* (2013.01); *H04R 17/00* (2013.01); *H04R 19/02* (2013.01); *H04R 2499/11* (2013.01)

(58) Field of Classification Search
  CPC .. H04R 2499/11; G06F 1/1616; G06F 1/1605
  USPC .......................................................... 381/386
  See application file for complete search history.

(56) References Cited

U.S. PATENT DOCUMENTS

| | | | |
|---|---|---|---|
| 6,392,871 B1 * | 5/2002 | Yanase | G06F 1/162 345/905 |
| 7,453,440 B2 | 11/2008 | Sun | |
| 7,894,850 B2 | 2/2011 | Chen | |
| 2011/0280428 A1 * | 11/2011 | Tseng | H04R 1/2811 381/332 |
| 2013/0329936 A1 * | 12/2013 | Tseng | H04R 1/02 381/387 |
| 2014/0049727 A1 * | 2/2014 | Qi | G09F 13/18 349/65 |

FOREIGN PATENT DOCUMENTS

| | | |
|---|---|---|
| CN | 102368165 | 3/2012 |
| WO | 2014/101033 A1 | 7/2014 |

* cited by examiner

1ST RESONANT FREQUENCY VS VOLUME
OF BACK CAVITY

ELECTRONIC DEVICE HAVING EXPANDABLE SPEAKER BOX

BACKGROUND

1. Field

An electronic device having an expandable speaker box is disclosed herein.

2. Background

Electronic devices having speaker boxes are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Embodiments will now be described in detail with reference to the accompanying drawings. Where possible, like reference have been used to indicate like elements.

Various embodiments directed to an electronic device having at least one expandable speaker box are disclosed herein. However, it should be understood that the various elements of the various embodiments may be combined or interchanged to create a desired electronic device.

Embodiments disclose herein are directed to an electronic device having at least one expandable speaker box. Embodiments disclosed herein are shown embodied in an electronic device in the form of an ultrathin laptop. However, embodiments are not so limited. That is, an expandable speaker box according to embodiments disclosed herein may be employed in any type of electronic device in which enhanced audio performance is desired.

Further, embodiments disclosed herein are directed to an electronic device including a base having at least one speaker disposed therein and at least one speaker box configured to expand. A lid having a display may be attached to the base. The lid may be rotatably, slidably, or foldably attached to the base.

The at least one speaker box may be at least partially formed of a compressible-expandable material, such as rubber. Alternatively, the at least one speaker box may be at least partially formed of a bi-metal material that expands when exposed to heat.

The at least one speaker box may be at least partially formed as part of a chassis of the electronic device. Further, the at least one speaker box may be configured to expand when the lid is opened and be compressed when the lid is closed. The electronic device may further include a button. The at least one speaker box may be configured to expand when a user presses the button a first time and be compressed when the user presses the button a second time.

A speaker may be disposed in each of the at least one speaker box. Further, each at least one speaker may be at least one of a piezoelectric speaker, a ceramic speaker, an electrostatic speaker, or another low profile/thin speaker.

The at least one speaker may include a plurality of speakers disposed adjacent lateral sides of the base and the at least one speaker box may include a plurality of speaker boxes having the plurality of speakers disposed therein, respectively. At least one wall of each of the plurality of speaker boxes may be formed of a compressible-expandable material, such as rubber. Alternatively, at least one wall of each of the plurality of speaker boxes may be formed of a bi-metal material that expands when exposed to heat.

The at least one speaker may include a pair of speakers disposed at a rear portion of the base. The rear portion of the base may have an enhanced thickness. The at least one expandable speaker box may include an area between the pair of speakers. At least one wall of the at least one speaker box may be formed of a compressible-expandible material, such as rubber. Alternatively, at least one wall of the at least one speaker box may be formed of a bi-metal material that expands when exposed to heat. The pair of speakers may be disposed in a position at a rear of an attachment point of the lid to the base.

An electronic device according to embodiments disclosed herein may be configured to sense, for example, by triggering a mechanical switch, or a proximity sensor, a status of the at least one speaker, for example, whether it is opened or closed, expanded or retracted, and apply a corresponding audio processing, for example, adjustment of equalization parameters, to optimize an audio performance of the electronic device.

Figure 1A:
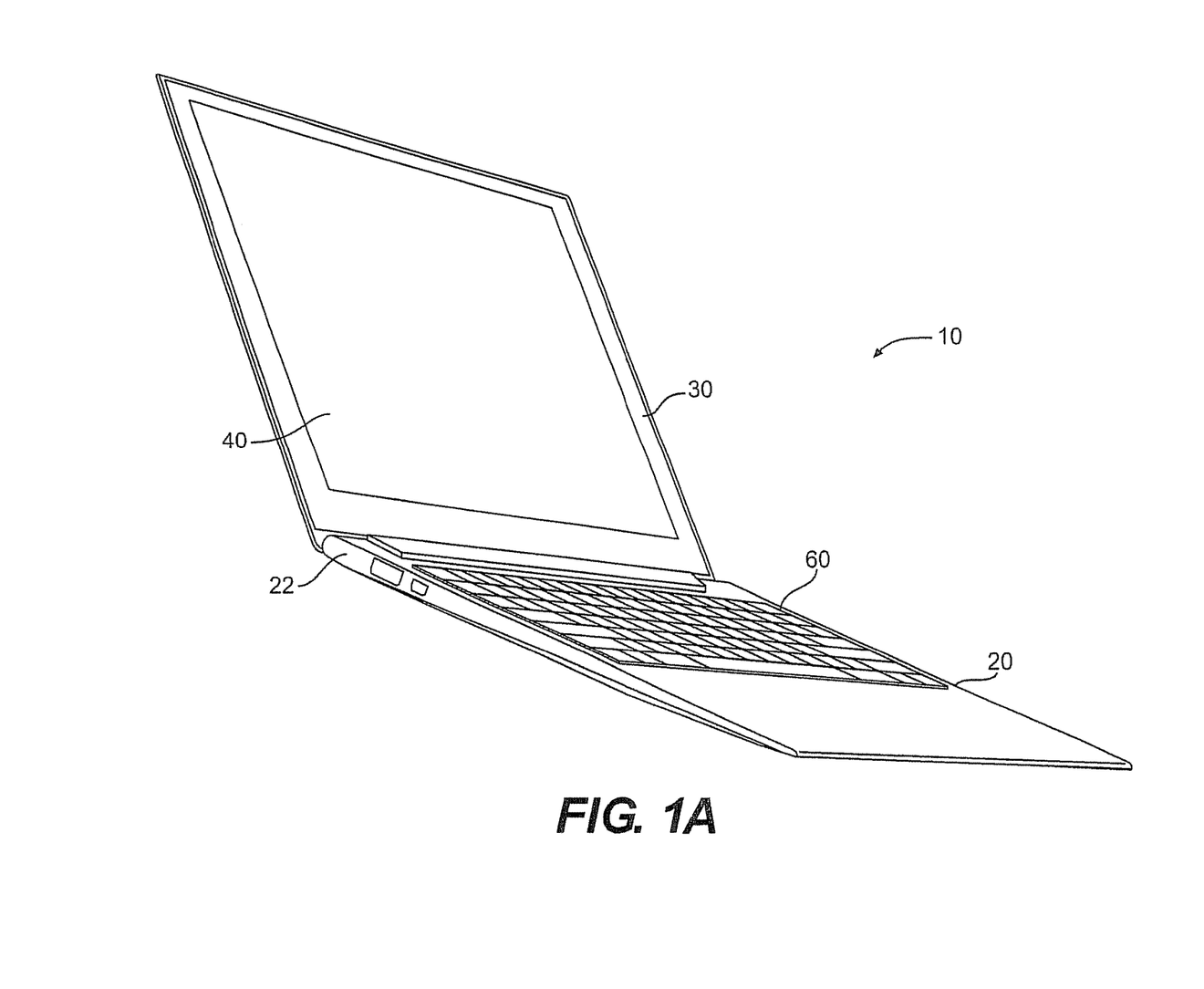
FIG. 1A is a front perspective view of an exemplary electronic device according to an embodiment.
Figure 1B:
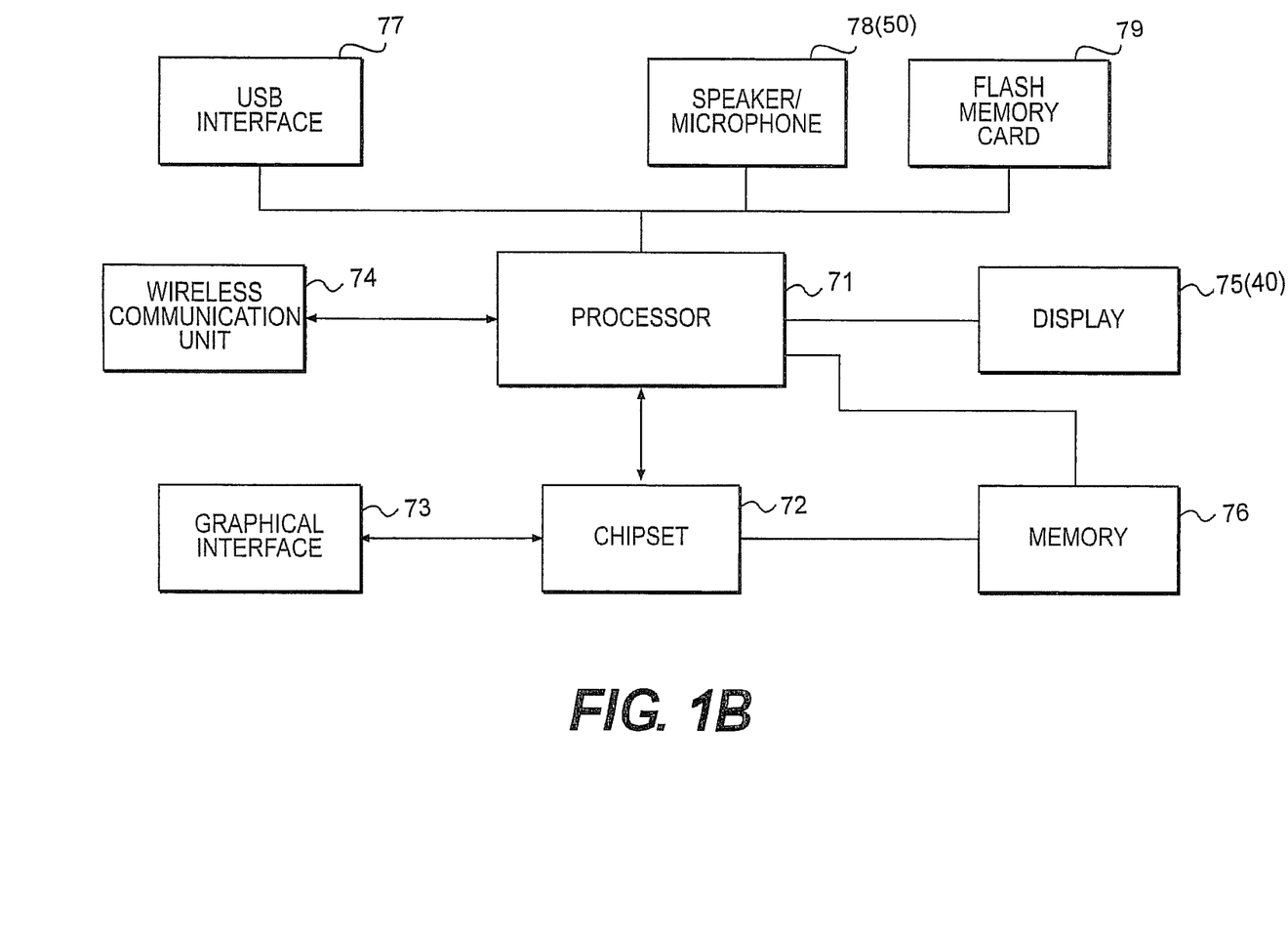
FIG. 1B is a block diagram of an exemplary electronic device according to an embodiment.
Figure 2A:
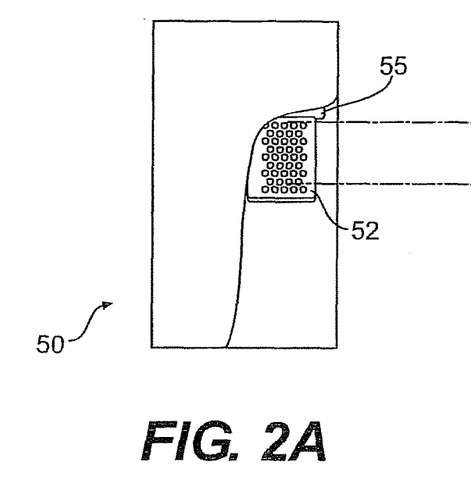
FIG. 2A is a partially cut-out bottom view of a speaker box of the electronic device of FIG. 1A.
Figure 2B:
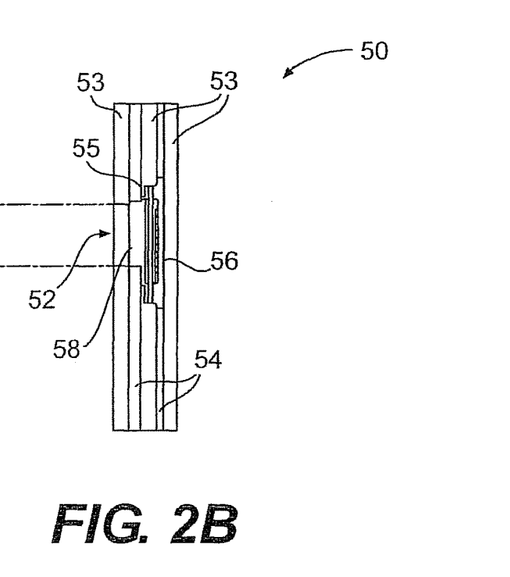
FIG. 2B is a side view of the speaker box of the electronic device of FIG. 1A.

FIG. 1A is a front perspective view of an exemplary electronic device according to an embodiment. FIG. 1B is a block diagram of an exemplary electronic device according to an embodiment. FIG. 2A is a partially cut-out bottom view of a speaker box of the electronic device of FIG. 1A. FIG. 2B is a side view of the speaker box of the electronic device of FIG. 1A.

The electronic device 10 of FIG. 1A may include a base 20 having a keyboard 60 and a lid 30 having a display 40. The lid 30 may be attached to the base 20. The lid 30 may be rotatably, slidably, or foldably attached to the base 20. Alternatively, the lid 30 may be omitted and the display 40 incorporated into the base 20. The display 40 may also be detached from the base 20 to turn the display 40 into a tablet.

The electronic device 10 may include various components, such as those shown in FIG. 1B. That is, the electronic device 10 device may include a processor 71, a chipset 72, a graphical interface 73, a wireless communications unit 74, a display 75(40), a memory 76, and a plurality of functional circuits including a universal serial bus (USB) interface 77, speaker and microphone circuits 78(50), and a flash memory card 79. A media player may also be provided. In other embodiments, a different combination or arrangements of circuits and functions may be included.

The base 20 may include an area 22 of enhanced thickness at a rear portion thereof. The area 22 of enhanced or increased thickness may be configured to house electronics therein.

The base 20 may include one or more speaker box 50, an example of which is shown in FIGS. 2A-2B. Each speaker box 50 may have a speaker 55 disposed therein. The speaker may be, for example, a piezoelectric speaker. Further, each speaker box 50 may include a front cavity 52, a rear cavity 56, and one or more sound emitting holes 58.

The one or more speaker box may be, for example, an ultra thin speaker box designed for slim or thin form factor devices, such as a smart phone, laptop or notebook computer, Ultrabook™, or tablet.

According to one embodiment, the speaker box may be, for example, ~50 mm in width, ~100 mm in length, and ~1-2 mm in depth. The speaker box 50 may be formed by a plurality of aluminum layers 53 with glass epoxy 54 disposed therebetween. The glass epoxy 54 functions as a spacer to create the cavities for the speaker box; however, embodiments are not so limited. Other materials may be employed, such as plastic or another layer of aluminum.

Each speaker box 50 may be an expandable speaker box, as discussed hereinbelow. By expanding the speaker box, for example, by expanding a back cavity or a front cavity of the speaker box, a low frequency response of the speaker may be enhanced.

Figure 4A:
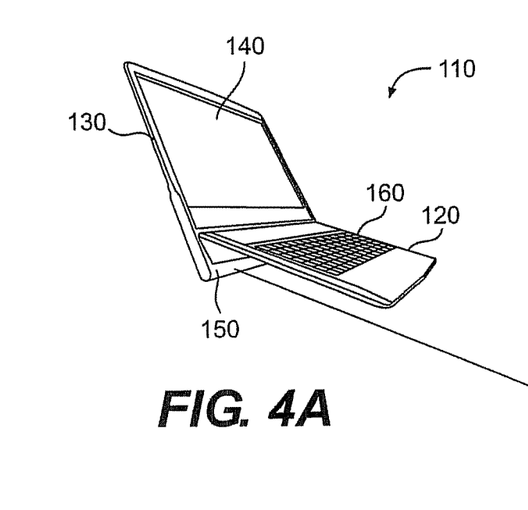
FIGS. 4A and 4B are a perspective view and a side view of an electronic device having an expandable speaker box according to an embodiment.
Figures 4B, 4D:
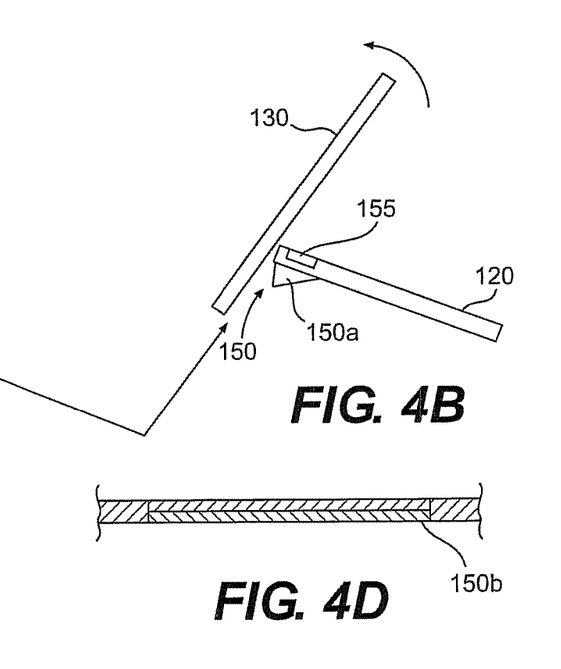
FIGS. 4D-4E are cross-sectional views of a rear wall of the speaker box of FIG. 4A according to another embodiment.
Figure 4C:
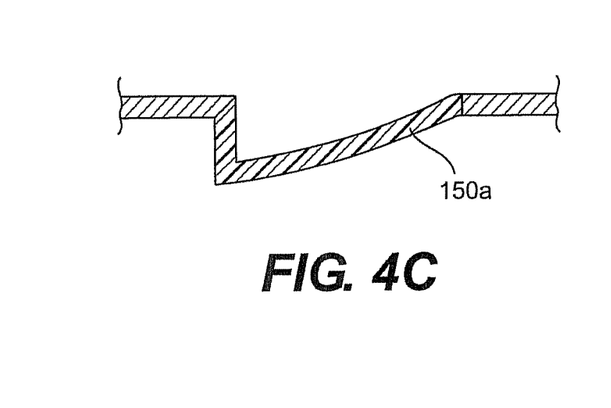
FIG. 4C is a cross-sectional view of a rear wall of the speaker box of FIG. 4A according to an embodiment.
Figure 4E:
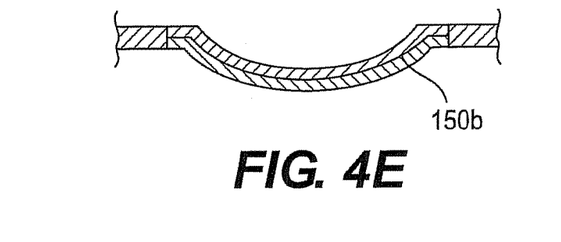

FIGS. 4A and 4B are a perspective view and a side view of an electronic device having an expandable speaker box according to an embodiment. FIG. 4C is a cross-sectional view of a rear wall of the speaker box of FIG. 4A according to an embodiment. FIGS. 4D-4E are cross-sectional views of a rear wall of the speaker box of FIG. 4A according to another embodiment.

The electronic device 110 of FIGS. 4A-4B may include a base 120 having a keyboard 160, and a lid 130 including a display 140, attached thereto. The lid 130 may be rotatably or slidably attached to the base 120. The base 120 may include at least one speaker box 150 with a speaker 155 disposed therein.

At least one wall 150a of the speaker box 150 may be formed of a compressible-expandable material, such as rubber. Thus, when the lid 130 is open and/or the electronic device 130 is in use, the speaker box 150 may expand, as shown in FIGS. 4A-4B. More particularly, three sides of the speaker box, in the form of a triangular wedge, may drop down and in essence increase an internal volume of the speaker box. However, when the lid 130 is closed and/or the electronic device 110 is not in use, the speaker box 150 may be compressed or retracted and stored inside the base 120.

Alternatively, a lower wall 150b of the speaker box 150 may be made of a bi-metal material, as shown in FIGS. 4D-4E. A bi-metal material is a material formed of two metal layers having different CTE (Coefficient of Thermal Expansion). This character makes its bending degree larger when its temperature rises. The larger bending degree of the bi-metal material may be utilized to increase the back cavity when the wall 150b expands due to heat, as shown in FIG. 4E.

Alternatively, the base 120 may include a latch mechanism (not shown) that releases the speaker box 150 to expand or compresses the speaker box 150. The base 120 may also include a button (see FIGS. 7A-7B) that communicates with the latch mechanism to release the speaker box 150 to expand or compress the speaker box 150.

Figure 5A:
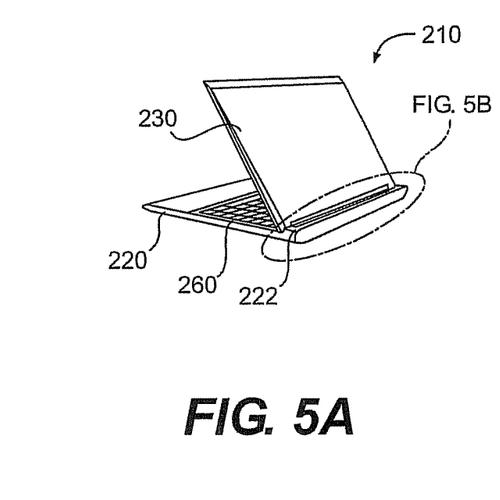
FIGS. 5A and 5B are a rear perspective view and a partial rear perspective view of an electronic device having an expandable speaker box according to an embodiment.
Figure 5B:
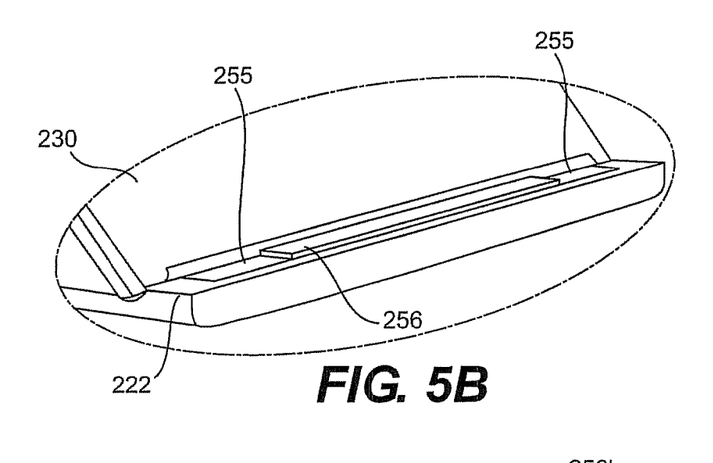
Figure 5C:
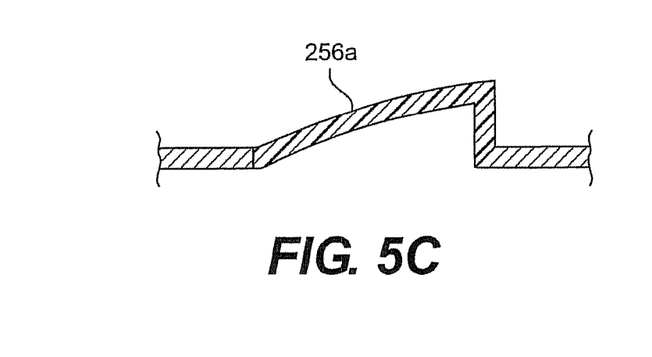
FIG. 5C is a cross-sectional view of an upper wall of the speaker box of FIG. 5A according to an embodiment.
Figure 5D:
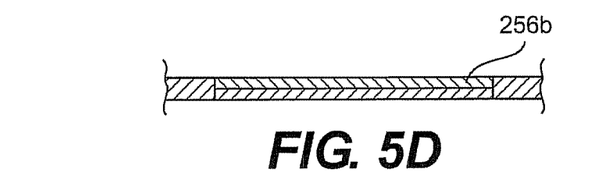
FIGS. 5D-5E are cross-sectional views of an upper wall of the speaker box of FIG. 5A according to another embodiment.
Figure 5E:
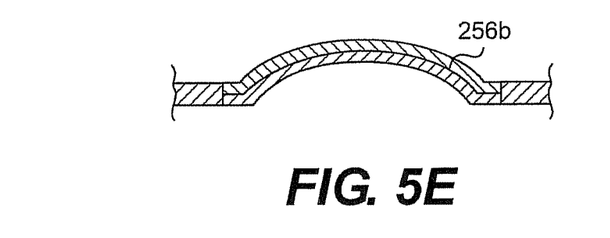

FIGS. 5A and 5B are a rear perspective view and a partial rear perspective view of an electronic device having an expandable speaker box according to an embodiment. FIG. 5C is a cross-sectional view of an upper wall of the speaker box of FIG. 5A according to an embodiment. FIGS. 5D-5E are cross-sectional views of an upper wall of the speaker box of FIG. 5A according to another embodiment.

The electronic device 210 of FIGS. 5A-5B may include a base 220 having a keyboard 260, and a lid 230 including a display 240, attached thereto. The lid 230 may be rotatably attached to the base 220. The base 220 may include at least one speaker box 250 with a speaker 255 disposed therein.

As shown in FIGS. 5A-5B, the base 220 may include an area 222 of enhanced thickness at a rear portion thereof. With this embodiment, a pair of speaker boxes 250 may be provided in the area 222.

Further, with this embodiment, one wall 256a of an area 256 between the pair of speaker boxes 250 may be formed of a compressible-expandable material, such as rubber, as shown in FIG. 5C. Alternatively, the area 256 may extend to encompass the pair of speaker boxes 250.

Alternative to use of a compressible-expandable material, one wall of the area 256b may be formed of a bi-metal material that expands when heated, as shown in FIGS. 5D-5E.

Alternatively, the area 256 and/or the pair speaker boxes 250, or a portion thereof may be in the form of a drawer that withdraws from the base 220, with the speakers 255 mounted therein.

The base 220 may include a latch mechanism (not shown) that releases the speaker box(s) 250 to expand or compress the speaker box(s) 250. The base 220 may also include a button (see FIGS. 7A-7B) that communicates with the latch mechanism to release the speaker box 250 to expand or compress the speaker box 250.

Figures 6A, 6B, 6C, 6D:
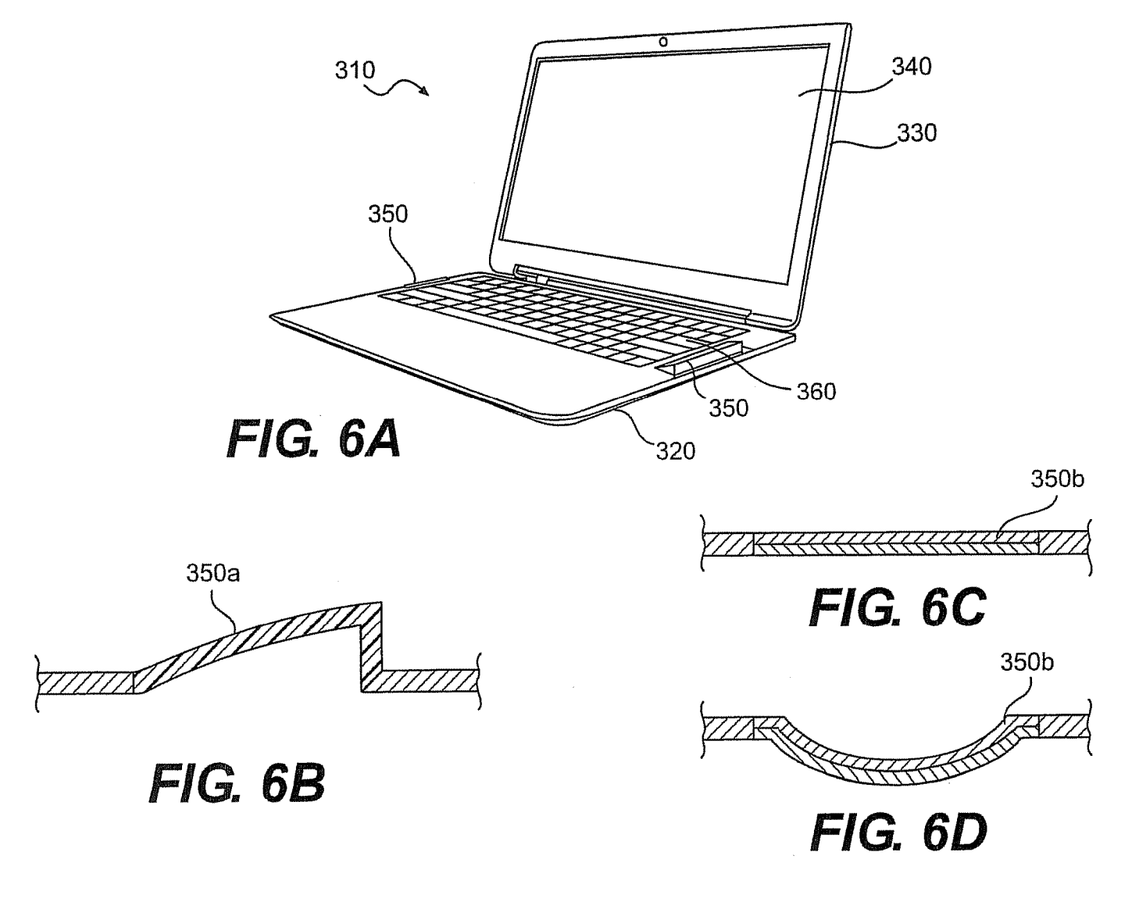
FIG. 6A is a front perspective view of an electronic device having an expandable speaker box according to an embodiment.
FIG. 6B is a cross-sectional view of an upper wall of the speaker box of FIG. 6A according to an embodiment.
FIGS. 6C-6D are cross-sectional views of an upper wall of the speaker box of FIG. 6A according to another embodiment.

FIG. 6A is a front perspective view of an electronic device having an expandable speaker box according to an embodiment. FIG. 6B is a cross-sectional view of upper wall of the speaker box of FIG. 6A according to an embodiment. FIGS. 6C-6D are cross-sectional views of an upper wall of the speaker box of FIG. 6A according to another embodiment.

The electronic device 310 of FIG. 6A may include a base 320 having a keyboard 360, and a lid 330 including a display 340, attached thereto. The lid 330 may be rotatably or slidably attached to the base 320. The base 320 may include at least one speaker box 350 with a speaker 355 disposed therein.

At least one wall 350a (in this embodiment, the upper wall) of the speaker box 350 may be formed of a compressible-expandable material, such as rubber, as shown in FIG. 6B. Thus, when the lid 330 is open and/or the electronic device 330 is in use, the speaker box 350 may expand, as shown in FIG. 6A. However, when the lid 330 is closed and/or the electronic device 310 is not in use, the speaker box 350 may be compressed by the lid 330.

Alternatively, a bottom wall 350b of the speaker box 350 may be made of a bi-metal material, as shown in FIGS. 6C-6D. The larger bending degree of the bi-metal material is utilized to increase the back cavity when the wall 350b expands due to heat, as shown in FIG. 6D.

Alternatively, the base 320 may include a latch mechanism (not shown) that releases the speaker box 350 to expand or compress the speaker box 350. The base 320 may also include a button (see FIGS. 7A-7B) that communicates with the latch mechanism to release the speaker box 350 to expand or compress the speaker box 150.

Figure 7A:
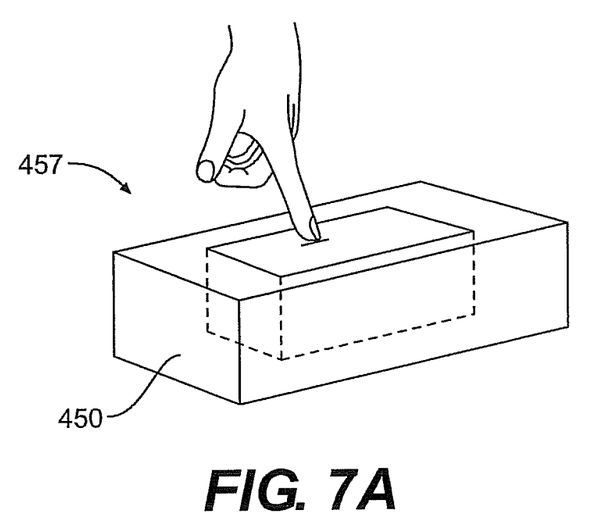
FIGS. 7A-7B are perspective views of an expandable speaker box according to another embodiment.
Figure 7B:
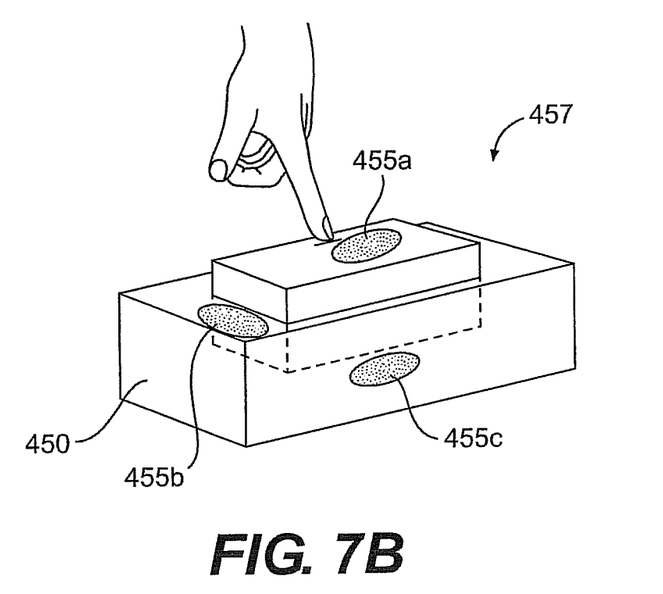

FIGS. 7A-7B are perspective views of an expandable speaker box according to another embodiment. As shown in FIGS. 7A-7B, the speaker box 450 may include a button or drawer 457. Alternatively, a button may be positioned adjacent the speaker box or at another location accessible by a user. A bottom wall of the button or drawer 457 may be open, so that when the button or drawer 457 is in an extended or expanded position, as shown in FIG. 7B, a total internal volume of the speaker box 450 may be increased. When a user pushes the button or drawer 457, the button or drawer 457 may expand to the expanded position, shown in FIG. 7B. When pressed again, the button or drawer 457 may retract to a retracted position, as shown in FIG. 7B.

A speaker 455a may be positioned on an upper wall of the speaker box 450. Alternatively, a speaker 455b may be mounted or positioned adjacent the speaker box 450. Also alternatively, a speaker 455c may be mounted or positioned at a bottom of the speaker box 240.

The speaker box 450 may be made of metal. Alternatively, sidewalls of the speaker box 450 may be made of a compressible-expandable material, such as rubber.

Figure 3:
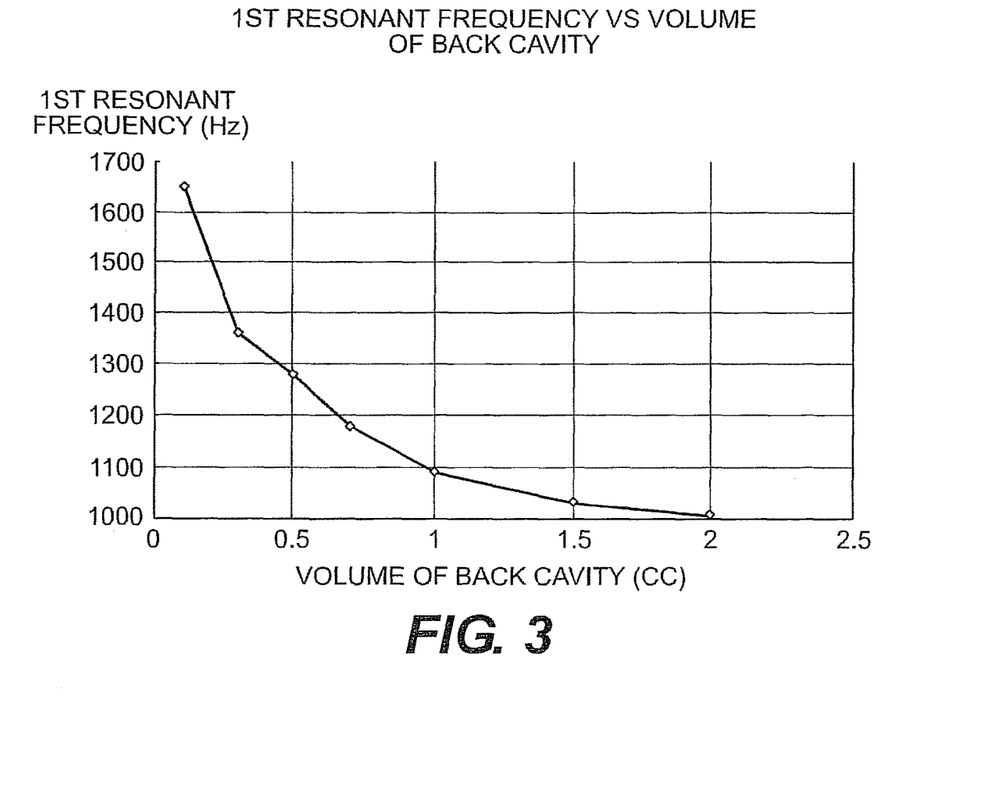
FIG. 3 is a graph showing improved audio performance for an electronic device having an expandable speaker box according to embodiments.

FIG. 3 is a graph showing improved audio performance for an electronic device having an expandable speaker box. The graph of FIG. 3 shows first resonance frequency (Hz) on the vertical axis and volume of the back cavity (cc) on the horizontal axis. As shown in FIG. 3, with use of the expandable speaker box, first resonance frequency decreases, resulting in enhanced audio performance. Because X-Y dimensions of the speaker box is relatively large, a slight increase in Z dimension (due, for example, to the expansion of the bi-metal, in one embodiment, a bottom side of the speaker box) provided significant increase to a total volume of the speaker box.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
a base having:
at least one speaker box located at least partially within the base, wherein the at least one speaker box is at least partially comprised of a bi-metal material, wherein the bi-metal material includes a first metal with a first coefficient of thermal expansion and a second metal with a second coefficient of thermal expansion, the first metal and the second metal being in contact, and wherein the bi-metal material is to bend in response to an application of heat causing the first metal to expand by a first amount based on the first coefficient of thermal expansion and the second metal to expand by a second amount based on the second coefficient of thermal expansion, the first amount being different from the second amount; and
at least one speaker located within the at least one speaker box; and
a lid attached to the base, wherein the at least one speaker box is to be expanded when the lid is open and the at least one speaker box is to be compressed when the lid is closed, wherein at least one wall of the at least one speaker box is displaced away from a surface of the base when the at least one speaker box is expanded, and wherein a first portion of the at least one wall is displaced further from the surface than a second portion of the at least one wall is displaced from the surface when the at least one speaker box is expanded.

2. The electronic device of claim 1, wherein the at least one speaker box is at least partially formed as part of a chassis of the electronic device.

3. The electronic device of claim 1, wherein the at least one speaker comprises a plurality of speakers disposed adjacent lateral sides of the base and the at least one speaker box comprises a plurality of speaker boxes having the plurality of speakers at least partially disposed therein, respectively.

4. The electronic device of claim 1, wherein the at least one speaker comprises a pair of speakers disposed at a rear portion of the base.

5. The electronic device of claim 4, wherein the rear portion of the base has an increased thickness.

6. The electronic device of claim 4, wherein the at least one expandable speaker box comprises an area between the pair of speakers.

7. The electronic device of claim 4, wherein the pair of speakers are disposed in a position near an attachment point of the lid to the base.

8. The electronic device of claim 1, wherein a portion of the at least one speaker box is in a form of a drawer.

9. The electronic device of claim 1, wherein the at least one wall is aligned with the surface when the at least one speaker box is compressed.

10. The electronic device of claim 1, wherein the lid is to contact the at least one wall when the lid is closed and is to cause the at least one speaker box to be compressed.

11. An electronic device, comprising:
a body having:
   one or more electronic components;
   at least one speaker box, wherein the at least one speaker box has at least one wall located at a surface of the body, wherein the at least one wall of the speaker box is at least partially formed of a bi-metal material to expand when exposed to heat, wherein a portion of the at least one wall of the speaker box formed of the bi-metal material is to bend in response to application of heat causing a first metal of the bi-metal material to expand by a first amount based on a coefficient of thermal expansion of the first metal and a second metal of the bi-metal material to expand by a second amount based on a coefficient of thermal expansion of the second metal, the coefficient of thermal expansion of the first metal being different from the coefficient of thermal expansion of the second metal, and wherein the first metal and the second metal are in contact;
   and at least one speaker located within the at least one speaker box.

12. The electronic device of claim 11, wherein the at least one speaker box is at least partially formed of a compressible-expandable material.

13. The electronic device of claim 11, wherein the at least one speaker box at least partially comprises a part of a chassis of the electronic device.

14. The electronic device of claim 11, further comprising a button, wherein the at least one speaker box is to further expand when the button is pressed.

15. The electronic device of claim 11, wherein the at least one speaker comprises a plurality of speakers disposed adjacent lateral sides of the base and the at least one speaker box comprises a plurality of speaker boxes having the plurality of speakers at least partially disposed therein, respectively.

16. The electronic device of claim 11, wherein the at least one speaker comprises a pair of speakers disposed at a rear portion of the base.

17. A device, comprising:
   a speaker box, wherein the speaker box has a wall that includes a first metal with a first coefficient of thermal expansion and a second metal with a second coefficient of thermal expansion, the second coefficient of thermal expansion being different than the first coefficient of thermal expansion and the first metal being in contact with the second metal, and wherein the wall is to bend in response to application of heat causing the first metal to expand by a first amount based on the first coefficient of thermal expansion and the second metal to expand by a second amount based on the second coefficient of thermal expansion, the second amount being different than the first amount; and
   a speaker located at least partially within the speaker box.

18. The device of claim 17, wherein the device further comprises a body, wherein the speaker box is located at least partially within the body and the wall is at a surface of the body, and wherein the speaker box expands from the surface when the wall is bent.

19. The device of claim 17, wherein the first metal is located within a first metal layer of the wall, and wherein the second metal is located within a second metal layer of the wall, the second metal layer being adjacent to the first metal layer.

20. The device of claim 17, wherein the wall is a first wall, wherein the speaker box has a second wall that is to expand in response to an absence of a compression force being applied to a side of the speaker box opposite to the first wall, and wherein the speaker box is to further expand based on the expansion of the second wall.

21. The device of claim 20, wherein the device further comprises:
   a body, wherein the speaker box is at least partially located within the body; and
   a lid rotatably coupled to the body, wherein the lid is to apply the compression force to the side of the speaker box when the lid is closed, and wherein the compression force is absent when the lid is open.

\* \* \* \* \*